US007028064B2

(12) United States Patent
Buchert et al.

(10) Patent No.: US 7,028,064 B2
(45) Date of Patent: *Apr. 11, 2006

(54) OPTIMIZED DISCRETE FOURIER TRANSFORM METHOD AND APPARATUS USING PRIME FACTOR ALGORITHM

(75) Inventors: Ryan Samuel Buchert, Phoenixville, PA (US); Sharif M. Shahrier, King of Prussia, PA (US); Peter Becker, Coatesville, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/782,035

(22) Filed: Feb. 19, 2004

(65) Prior Publication Data

US 2004/0162867 A1 Aug. 19, 2004

Related U.S. Application Data

(63) Continuation of application No. 10/120,971, filed on Apr. 11, 2002, now Pat. No. 6,704,760.

(51) Int. Cl.
*G06F 17/14* (2006.01)

(52) U.S. Cl. .................................................. 708/405
(58) Field of Classification Search ................. 708/405
See application file for complete search history.

(56) References Cited

U.S. PATENT DOCUMENTS

| 4,156,920 A | 5/1979 | Winograd |
| 4,604,721 A | 8/1986 | Gray |
| 6,351,759 B1 | 2/2002 | Moretti |

*Primary Examiner*—D. H. Malzahn
(74) *Attorney, Agent, or Firm*—Volpe and Koenig, P.C.

(57) ABSTRACT

An apparatus and method for DFT processing using prime factor algorithm (PFA) on a selected number P of midamble chip values received by a CDMA receiver, where P has a plurality M of relatively prime factors F, and the DFT process is divided into M successive F-point DFT processes. The P data values are retrieved from a single input port memory and selectively permuted by a controller into parallel caches to optimize factoring with associated twiddle factors stored in parallel registers. The permuted inputs are factored in two or more parallel PFA circuits that comprise adders and multipliers arranged to accommodate any size F-point DFT. The outputs of the PFA circuits are processed by consolidation circuitry in preparation for output permutation of the values which are sent to memory for subsequent DFT cycles.

6 Claims, 13 Drawing Sheets

8 POINT DFT

| SET | Real Twiddle Factors ||||||||| Imaginary Twiddle Factors |||||||| |
|---|---|---|---|---|---|---|---|---|---|---|---|---|---|---|---|---|
|  | N0 | N1 | N2 | N3 | N4 | N5 | N6 | N7 | N0 | N1 | N2 | N3 | N4 | N5 | N6 | N7 |
| 0 | 1 | 1 | 1 | 1 | 1 | 1 | 1 | 1 | 0 | 0 | 0 | 0 | 0 | 0 | 0 | 0 |
| 1 | 1 | 0.707 | 0.000 | -0.707 | -1.000 | -0.707 | 0.000 | 0.707 | 0.000 | 0.707 | 1.000 | 0.707 | 0.000 | -0.707 | -1.000 | -0.707 |
| 2 | 1 | 0.000 | -1.000 | 0.000 | 1.000 | 0.000 | -1.000 | 0.000 | 0.000 | 1.000 | 0.000 | -1.000 | 0.000 | 1.000 | 0.000 | -1.000 |
| 3 | 1 | -0.707 | 0.000 | 0.707 | -1.000 | 0.707 | 0.000 | -0.707 | 0.000 | 0.707 | -1.000 | 0.707 | 0.000 | -0.707 | 1.000 | -0.707 |
| 4 | 1 | -1.000 | 1.000 | -1.000 | 1.000 | -1.000 | 1.000 | -1.000 | 0.000 | 0.000 | 0.000 | 0.000 | 0.000 | 0.000 | 0.000 | 0.000 |
| 5 | 1 | -0.707 | 0.000 | 0.707 | -1.000 | 0.707 | 0.000 | -0.707 | 0.000 | -0.707 | 1.000 | -0.707 | 0.000 | 0.707 | -1.000 | 0.707 |
| 6 | 1 | 0.000 | -1.000 | 0.000 | 1.000 | 0.000 | -1.000 | 0.000 | 0.000 | -1.000 | 0.000 | 1.000 | 0.000 | -1.000 | 0.000 | 1.000 |
| 7 | 1 | 0.707 | 0.000 | -0.707 | -1.000 | -0.707 | 0.000 | 0.707 | 0.000 | -0.707 | -1.000 | -0.707 | 0.000 | 0.707 | 1.000 | 0.707 |

(A)

$REAL = X_R(0)\cos(k_0) +$
$(X_R(1)+X_R(7))\cos(k_1) + (X_I(1)-X_I(7))\sin(k_1) +$
$(X_R(2)+X_R(6))\cos(k_2) + (X_I(2)-X_I(6))\sin(k_2) +$
$(X_R(3)+X_R(5))\cos(k_3) + (X_I(3)-X_I(5))\sin(k_3) +$
$X_R(4)\cos(k_4) \quad + X_I(4)\sin(k_4)$ (B)

(C)

$IMAG = X_I(0)\sin(k_0) +$
$(X_I(1)+X_I(7))\sin(k_1) - (X_R(1)-X_R(7))\cos(k_1) +$
$(X_I(2)+X_I(6))\sin(k_2) - (X_R(2)-X_R(6))\cos(k_2) +$
$(X_I(3)+X_I(5))\sin(k_3) - (X_R(3)-X_R(5))\cos(k_3) +$
$X_I(4)\sin(k_4) \quad - X_R(4)\cos(k_4)$ (D)

8 POINT DFT INPUT OPTIMIZATION

FIG. 2C

| set | N0 | N1 | N2 | N3 | N4 | N5 | N6 | N7 | N8 | N9 | Real Twiddle Factors N10 | N11 | N12 | N13 | N14 | N15 | N16 | N17 | N18 |
|---|---|---|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 | 1 | 1 | 1 |
| 1 | 1 | 0.946 | 0.789 | 0.547 | 0.245 | -0.083 | -0.402 | -0.677 | -0.879 | -0.986 | -0.986 | -0.879 | -0.677 | -0.402 | -0.083 | 0.245 | 0.547 | 0.789 | 0.946 |
| 2 | 1 | 0.789 | 0.245 | -0.402 | -0.879 | -0.986 | -0.677 | -0.083 | 0.547 | 0.946 | 0.946 | 0.547 | -0.083 | -0.677 | -0.986 | -0.879 | -0.402 | 0.245 | 0.789 |
| 3 | 1 | 0.547 | -0.402 | -0.986 | -0.677 | 0.245 | 0.946 | 0.789 | -0.083 | -0.879 | -0.879 | -0.083 | 0.789 | 0.946 | 0.245 | -0.677 | -0.986 | -0.402 | 0.547 |
| 4 | 1 | 0.245 | -0.879 | -0.677 | 0.547 | 0.946 | -0.083 | -0.986 | -0.402 | 0.789 | 0.789 | -0.402 | -0.986 | -0.083 | 0.946 | 0.547 | -0.677 | -0.879 | 0.245 |
| 5 | 1 | -0.083 | -0.986 | 0.245 | 0.946 | -0.402 | -0.879 | 0.547 | 0.789 | -0.677 | -0.677 | 0.789 | 0.547 | -0.879 | -0.402 | 0.946 | 0.245 | -0.986 | -0.083 |
| 6 | 1 | -0.402 | -0.677 | 0.946 | -0.083 | -0.879 | 0.789 | 0.245 | -0.986 | 0.547 | 0.547 | -0.986 | 0.245 | 0.789 | -0.879 | -0.083 | 0.946 | -0.677 | -0.402 |
| 7 | 1 | -0.677 | -0.083 | 0.789 | -0.986 | 0.547 | 0.245 | -0.879 | 0.946 | -0.402 | -0.402 | 0.946 | -0.879 | 0.245 | 0.547 | -0.986 | 0.789 | -0.083 | -0.677 |
| 8 | 1 | -0.879 | 0.547 | -0.083 | -0.402 | 0.789 | -0.986 | 0.946 | -0.677 | 0.245 | 0.245 | -0.677 | 0.946 | -0.986 | 0.789 | -0.402 | -0.083 | 0.547 | -0.879 |
| 9 | 1 | -0.986 | 0.946 | -0.879 | 0.789 | -0.677 | 0.547 | -0.402 | 0.245 | -0.083 | -0.083 | 0.245 | -0.402 | 0.547 | -0.677 | 0.789 | -0.879 | 0.946 | -0.986 |
| 10 | 1 | -0.986 | 0.946 | -0.879 | 0.789 | -0.677 | 0.547 | -0.402 | 0.245 | -0.083 | -0.083 | 0.245 | -0.402 | 0.547 | -0.677 | 0.789 | -0.879 | 0.946 | -0.986 |
| 11 | 1 | -0.879 | 0.547 | -0.083 | -0.402 | 0.789 | -0.986 | 0.946 | -0.677 | 0.245 | 0.245 | -0.677 | 0.946 | -0.986 | 0.789 | -0.402 | -0.083 | 0.547 | -0.879 |
| 12 | 1 | -0.677 | -0.083 | 0.789 | -0.986 | 0.547 | 0.245 | -0.879 | 0.946 | -0.402 | -0.402 | 0.946 | -0.879 | 0.245 | 0.547 | -0.986 | 0.789 | -0.083 | -0.677 |
| 13 | 1 | -0.402 | -0.677 | 0.946 | -0.083 | -0.879 | 0.789 | 0.245 | -0.986 | 0.547 | 0.547 | -0.986 | 0.245 | 0.789 | -0.879 | -0.083 | 0.946 | -0.677 | -0.402 |
| 14 | 1 | -0.083 | -0.986 | 0.245 | 0.946 | -0.402 | -0.879 | 0.547 | 0.789 | -0.677 | -0.677 | 0.789 | 0.547 | -0.879 | -0.402 | 0.946 | 0.245 | -0.986 | -0.083 |
| 15 | 1 | 0.245 | -0.879 | -0.677 | 0.547 | 0.946 | -0.083 | -0.986 | -0.402 | 0.789 | 0.789 | -0.402 | -0.986 | -0.083 | 0.946 | 0.547 | -0.677 | -0.879 | 0.245 |
| 16 | 1 | 0.547 | -0.402 | -0.986 | -0.677 | 0.245 | 0.946 | 0.789 | -0.083 | -0.879 | -0.879 | -0.083 | 0.789 | 0.946 | 0.245 | -0.677 | -0.986 | -0.402 | 0.547 |
| 17 | 1 | 0.789 | 0.245 | -0.402 | -0.879 | -0.986 | -0.677 | -0.083 | 0.547 | 0.946 | 0.946 | 0.547 | -0.083 | -0.677 | -0.986 | -0.879 | -0.402 | 0.245 | 0.789 |
| 18 | 1 | 0.946 | 0.789 | 0.547 | 0.245 | -0.083 | -0.402 | -0.677 | -0.879 | -0.986 | -0.986 | -0.879 | -0.677 | -0.402 | -0.083 | 0.245 | 0.547 | 0.789 | 0.946 |

19 POINT DFT

FIG. 3B

| set | | Imaginary Twiddle Factors | | | | | | | | | | | | | | | | | |
|---|---|---|---|---|---|---|---|---|---|---|---|---|---|---|---|---|---|---|---|
| | N0 | N1 | N2 | N3 | N4 | N5 | N6 | N7 | N8 | N9 | N10 | N11 | N12 | N13 | N14 | N15 | N16 | N17 | N18 |
| 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0.325 | 0.614 | 0.837 | 0.969 | 0.997 | 0.916 | 0.736 | 0.476 | 0.165 | -0.165 | -0.476 | -0.736 | -0.916 | -0.997 | -0.969 | -0.837 | -0.614 | -0.325 |
| 2 | 0 | 0.614 | 0.969 | 0.916 | 0.476 | -0.165 | -0.736 | -0.997 | -0.837 | -0.325 | 0.325 | 0.837 | 0.997 | 0.736 | 0.165 | -0.476 | -0.916 | -0.969 | -0.614 |
| 3 | 0 | 0.837 | 0.916 | 0.165 | -0.736 | -0.969 | -0.325 | 0.614 | 0.997 | 0.476 | -0.476 | -0.997 | -0.614 | 0.325 | 0.969 | 0.736 | -0.165 | -0.916 | -0.837 |
| 4 | 0 | 0.969 | 0.476 | -0.736 | -0.837 | 0.325 | 0.997 | 0.165 | -0.916 | -0.614 | 0.614 | 0.916 | -0.165 | -0.997 | -0.325 | 0.837 | 0.736 | -0.476 | -0.969 |
| 5 | 0 | 0.997 | -0.165 | -0.969 | 0.325 | 0.916 | -0.476 | -0.837 | 0.614 | 0.736 | -0.736 | -0.614 | 0.837 | 0.476 | -0.916 | -0.325 | 0.969 | 0.165 | -0.997 |
| 6 | 0 | 0.916 | -0.736 | -0.325 | 0.997 | -0.476 | -0.614 | 0.969 | -0.165 | -0.837 | 0.837 | 0.165 | -0.969 | 0.614 | 0.476 | -0.997 | 0.325 | 0.736 | -0.916 |
| 7 | 0 | 0.736 | -0.997 | 0.614 | 0.165 | -0.837 | 0.969 | -0.476 | -0.325 | 0.916 | -0.916 | 0.325 | 0.476 | -0.969 | 0.837 | -0.165 | -0.614 | 0.997 | -0.736 |
| 8 | 0 | 0.476 | -0.837 | 0.997 | -0.916 | 0.614 | -0.165 | -0.325 | 0.736 | -0.969 | 0.969 | -0.736 | 0.325 | 0.165 | -0.614 | 0.916 | -0.997 | 0.837 | -0.476 |
| 9 | 0 | 0.165 | -0.325 | 0.476 | -0.614 | 0.736 | -0.837 | 0.916 | -0.969 | 0.997 | -0.997 | 0.969 | -0.916 | 0.837 | -0.736 | 0.614 | -0.476 | 0.325 | -0.165 |
| 10 | 0 | -0.165 | 0.325 | -0.476 | 0.614 | -0.736 | 0.837 | -0.916 | 0.969 | -0.997 | 0.997 | -0.969 | 0.916 | -0.837 | 0.736 | -0.614 | 0.476 | -0.325 | 0.165 |
| 11 | 0 | -0.476 | 0.837 | -0.997 | 0.916 | -0.614 | 0.165 | 0.325 | -0.736 | 0.969 | -0.969 | 0.736 | -0.325 | -0.165 | 0.614 | -0.916 | 0.997 | -0.837 | 0.476 |
| 12 | 0 | -0.736 | 0.997 | -0.614 | -0.165 | 0.837 | -0.969 | 0.476 | 0.325 | -0.916 | 0.916 | -0.325 | -0.476 | 0.969 | -0.837 | 0.165 | 0.614 | -0.997 | 0.736 |
| 13 | 0 | -0.916 | 0.736 | 0.325 | -0.997 | 0.476 | 0.614 | -0.969 | 0.165 | 0.837 | -0.837 | -0.165 | 0.969 | -0.614 | -0.476 | 0.997 | -0.325 | -0.736 | 0.916 |
| 14 | 0 | -0.997 | 0.165 | 0.969 | -0.325 | -0.916 | 0.476 | 0.837 | -0.614 | -0.736 | 0.736 | 0.614 | -0.837 | -0.476 | 0.916 | 0.325 | -0.969 | -0.165 | 0.997 |
| 15 | 0 | -0.969 | -0.476 | 0.736 | 0.837 | -0.325 | -0.997 | -0.165 | 0.916 | 0.614 | -0.614 | -0.916 | 0.165 | 0.997 | 0.325 | -0.837 | -0.736 | 0.476 | 0.969 |
| 16 | 0 | -0.837 | -0.916 | -0.165 | 0.736 | 0.969 | 0.325 | -0.614 | -0.997 | -0.476 | 0.476 | 0.997 | 0.614 | -0.325 | -0.969 | -0.736 | 0.165 | 0.916 | 0.837 |
| 17 | 0 | -0.614 | -0.969 | -0.916 | -0.476 | 0.165 | 0.736 | 0.997 | 0.837 | 0.325 | -0.325 | -0.837 | -0.997 | -0.736 | -0.165 | 0.476 | 0.916 | 0.969 | 0.614 |
| 18 | 0 | -0.325 | -0.614 | -0.837 | -0.969 | -0.997 | -0.916 | -0.736 | -0.476 | -0.165 | 0.165 | 0.476 | 0.736 | 0.916 | 0.997 | 0.969 | 0.837 | 0.614 | 0.325 |

19 POINT DFT

*FIG. 3C*

$$REAL = X_R(0)\cos(k_0) +$$
$$(X_R(1)+X_R(18))\cos(k_1) + (X_I(1)-X_I(18))\sin(k_1) +$$
$$(X_R(2)+X_R(17))\cos(k_2) + (X_I(2)-X_I(17))\sin(k_2) +$$
$$(X_R(3)+X_R(16))\cos(k_3) + (X_I(3)-X_I(16))\sin(k_3) +$$
$$(X_R(4)+X_R(15))\cos(k_4) + (X_I(4)-X_I(15))\sin(k_4) +$$
$$(X_R(5)+X_R(14))\cos(k_5) + (X_I(5)-X_I(14))\sin(k_5) +$$
$$(X_R(6)+X_R(13))\cos(k_6) + (X_I(6)-X_I(13))\sin(k_6) +$$
$$(X_R(7)+X_R(12))\cos(k_7) + (X_I(7)-X_I(12))\sin(k_7) +$$
$$(X_R(8)+X_R(11))\cos(k_8) + (X_I(8)-X_I(11))\sin(k_8) +$$
$$(X_R(9)+X_R(10))\cos(k_9) + (X_I(9)-X_I(10))\sin(k_9)$$

$$IMAG = X_I(0)\sin(k_0) +$$
$$(X_I(1)+X_I(18))\sin(k_1) - (X_R(1)-X_R(18))\cos(k_1) +$$
$$(X_I(2)+X_I(17))\sin(k_2) - (X_R(2)-X_R(17))\cos(k_2) +$$
$$(X_I(3)+X_I(16))\sin(k_3) - (X_R(3)-X_R(16))\cos(k_3) +$$
$$(X_I(4)+X_I(15))\sin(k_4) - (X_R(4)-X_R(15))\cos(k_4) +$$
$$(X_I(5)+X_I(14))\sin(k_5) - (X_R(5)-X_R(14))\cos(k_5) +$$
$$(X_I(6)+X_I(13))\sin(k_6) - (X_R(6)-X_R(13))\cos(k_6) +$$
$$(X_I(7)+X_I(12))\sin(k_7) - (X_R(7)-X_R(12))\cos(k_7) +$$
$$(X_I(8)+X_I(11))\sin(k_8) - (X_R(8)-X_R(11))\cos(k_8) +$$
$$(X_I(9)+X_I(10))\sin(k_9) - (X_R(9)-X_R(10))\cos(k_9)$$

19 POINT DFT INPUT OPTIMIZATION

*FIG. 3D*

456 POINT DFT USING PFA

| STAGE | | CLOCK-> | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|---|---|
| 1 | | MEM TEMP OUT 561 | 0 | 1 | 2 | 3 | 4 | 5 | 6 | 7 | | | | | | | | | | | | | | | | | | | | | | | | |
| 2 | | Cache In 572 | | 0 | 1 | 2 | 3 | 4 | | | | | | | | | | | | | | | | | | | | | | | | | | |
| | | Cache In 573 | | | | | | | 5 | 6 | 7 | | | | | | | | | | | | | | | | | | | | | | | | |
| 3 | | Cache Out 582 | | | | | | | | | | 0 | 1 | 2 | 3 | 4 | 0 | 1 | 2 | 3 | 4 | 0 | 1 | 2 | 3 | 4 | 0 | 1 | 2 | 3 | 0 | 1 | 2 | 3 |
| | | Cache Out 583 | | | | | | | | | | | | 7 | 6 | 5 | 7 | 6 | 5 | 7 | 6 | 5 | 7 | 6 | 5 | | | 7 | 6 | 5 | 7 | 6 | 5 | 7 |
| | | Twiddle 574 | | | | | | | | | | set 0 | set 0 | set 0 | set 0 | set 0 | set 2 | set 2 | set 2 | set 2 | set 2 | set 2 | set 4 | set 4 | set 4 | set 4 | set 0 | set 0 | set 0 | set 0 | set 2 | set 2 | set 2 | set 2 |
| | | Twiddle 575 | | | | | | | | | | set 1 | set 1 | set 1 | set 1 | set 1 | set 3 | set 3 | set 3 | set 3 | set 3 | set 3 | | | | | set 1 | set 1 | set 1 | set 1 | set 3 | set 3 | set 3 | set 3 |
| 4 | | Math In 506 | | | | | | | | | | | | 0 | 1 | 2 | 3 | 4 | | | | | | 0 | 1 | 2 | 3 | 4 | | | | | | |
| | | Math In 507 | | | | | | | | | | | | 7 | 6 | 5 | | | | | | | | 7 | 6 | 5 | | | | | | | | |
| | | Math In 508 | | | | | | | | | | | | set 0 | set 0 | set 0 | set 0 | set 0 | set 2 | set 2 | set 2 | set 2 | set 2 | | | | | set 0 | set 0 | set 0 | set 0 | set 2 | set 2 | set 2 |
| | | Math In 509 | | | | | | | | | | | | | 0 | 1 | 2 | 3 | 4 | | | | | | 0 | 1 | 2 | 3 | 4 | | | | | |
| | | Math In 510 | | | | | | | | | | | | | 7 | 6 | 5 | | | | | | | | 7 | 6 | 5 | | | | | | | |
| | | Math In 511 | | | | | | | | | | | | set 1 | set 1 | set 1 | set 1 | set 1 | set 3 | set 3 | set 3 | set 3 | set 3 | set 4 | set 4 | set 4 | set 4 | set 1 | set 1 | set 1 | set 1 | set 3 | set 3 | set 3 |
| 5 | | Math Add 541 | | | | | | | | | | | | | | sum | sum | all | sum | sum | sum | sum | all | sum | sum | sum | sum | all | sum | sum | sum | sum | all | sum |
| | | Math Add 542 | | | | | | | | | | | | | | sum | sum | | sum | sum | sum | sum | | | | | | | sum | sum | sum | sum | | |
| | | Math Add 545 | | | | | | | | | | | | | | sum | sum | | sum | sum | sum | sum | | | | | | | sum | sum | sum | sum | | |
| | | Math Add 546 | | | | | | | | | | | | | | sum | sum | | sum | sum | sum | sum | | | | | | | sum | sum | sum | sum | | |
| 6 | | Math Out 551 | | | | | | | | | | | | | | 0 | 0 | 0 | 0 | 0 | 0 | 0 | 0 | 2 | 2 | 2 | 2 | 2 | 2 | 2 | 4 | 4 | 4 | 4 |
| | | Math Out 552 | | | | | | | | | | | | | | 0 | 0 | X | X | X | X | X | X | 6 | 6 | 6 | 6 | 6 | 6 | X | X | X | X | X |
| | | Math Out 555 | | | | | | | | | | | | | | 0 | 0 | 1 | 1 | 1 | 1 | 1 | 1 | 3 | 3 | 3 | 3 | 3 | 3 | 3 | X | X | X | X |
| | | Math Out 556 | | | | | | | | | | | | | | 0 | 0 | 7 | 7 | 7 | 7 | 7 | 7 | 5 | 5 | 5 | 5 | 5 | 5 | X | X | X | X | X |
| 7 | | MEM TEMP IN 565 | | | | | | | | | | | | | | | | | | 0 | X | X | 1 | 7 | 2 | 6 | 3 | 5 | 4 | X | X | X | X | X |

8 POINT DFT TIMING

OPTIMIZED DISCRETE FOURIER TRANSFORM METHOD AND APPARATUS USING PRIME FACTOR ALGORITHM

CROSS REFERENCE TO RELATED APPLICATIONS

This application is a continuation of U.S. patent application Ser. No. 10/120,971, filed on Apr. 11, 2002, which issued on Mar. 9, 2004 as U.S. Pat. No. 6,704,760.

BACKGROUND

The invention generally relates to discrete Fourier transforms (DFT). In particular, the invention relates to an apparatus and method using a prime factor algorithm (PFA) implementation of DFT components.

In CDMA wireless communications between a base station and a user equipment (UE), channel estimation is performed on the midamble section of the CDMA time slot. Depending on the system burst type, the period length $L_m$ for a typical CDMA midamble is either 256 or 512 chips. However, a portion P of the midamble that is digitally processed for channel estimation is trimmed, such as to 192 or 456 chips respectively, to eliminate the potential bleeding of the adjacent data burst data into the midamble that would corrupt the channel estimation.

The Discrete Fourier Transform (DFT) is a popular mathematical tool that converts the input signal from the discrete time domain to the discrete frequency domain, defined by Equation 1:

$$X(n) = \sum_{K=0}^{N-1} x(k) \cdot W^{nk} \qquad \text{Equation 1}$$

where $W^{nk} = e^{-j2\pi nk/N}$ represents a twiddle factor, with real and imaginary portions $\cos(2\pi nk/N)$ and $\sin(2\pi nk/N)$, respectively.

When N points are processed using DFT, the number of operations needed to complete the processing are of the order $N^2$. Using a radix 2 Fast Fourier Transform (FFT) to process a digital signal with N points, the number of operations is considerably less at an order of $N \log(N)$. However, there is a drawback in taking advantage of the faster radix 2 FFT method, since the input must be padded with zeros for cases where the number N points to be processed is not of the order $2^N$ (radix 2), such as for P=192 or 456. By artificially adding zeros to the input signal, the channel estimation becomes more of an approximation since the processing is then performed in a set of values that do not truly represent the signal.

A solution is to decompose the digital signal processing by using smaller matrices of sizes based on the prime factors of P, which results in a method with the accuracy of DFT and with significantly less operations closer to that of FFT method.

Minimizing memory hardware space is a primary concern within a CDMA receiver. Rather then gaining the benefit of operation efficiency through multiple parallel input/output ports, memory with a reduced number of ports such as single or dual port memory are commonly used instead. When data points are stored across a multitude of addresses, with limited input/output (I/O) ports, the hardware becomes the limiting factor for the data processing and retrieving the data to perform computations may require repeated memory accesses, which is inefficient. Thus, during the DFT process, it is desirable to perform as many operations as possible on a piece of data in order to retrieve it less often, with minimal hardware under the limited access constraints.

SUMMARY

An apparatus and method for DFT processing that uses prime factor algorithm (PFA) on a selected number P of midamble chip values received by a CDMA receiver, where P has a plurality M of relatively prime factors F, and the DFT process is divided into M successive F-point DFT processes. During each F-point DFT, the P data values are retrieved from a single port memory and selectively permuted by a controller into parallel caches to optimize factoring with associated twiddle factors stored in parallel registers. The permuted inputs are factored in two or more parallel PFA circuits that comprise adders and multipliers arranged to accommodate any size F-point DFT. The outputs of the PFA circuits are processed by consolidation circuitry in preparation for output permutation of the values which are sent to memory. Once all of the P values are processed for the first of M DFT cycles, the process is repeated for the remaining M cycles using the remaining F values. Operations and hardware are minimized by the input permutation which takes advantage of the inherent symmetries of twiddle factors.

BRIEF DESCRIPTION OF THE DRAWINGS

FIG. 2C shows the optimized factoring equations for real and imaginary portions of an 8-point DFT process.

FIG. 3B shows the real twiddle factors for twiddle sets 0–18 and points N0–N18.

FIG. 3C shows the imaginary twiddle factors for twiddle sets 0–18 and points N0–N18.

FIG. 3D shows the optimized factoring equations for real and imaginary portions of a 19-point DFT process.

FIG. 7 shows the timing of data flow for an 8-point DFT through the various stages of the circuit shown in FIG. 5.

DETAILED DESCRIPTION OF THE PREFERRED EMBODIMENTS

The optimized DFT process described herein can be utilized by any apparatus, system or process suitable for signal processing. Although the preferred application uses optimized DFTs for channel estimation in a communication system base station or UE, it may be applied to other DFT applications, including, but not limited to, multi-user detection at either a base station or UE.

Figure 1:
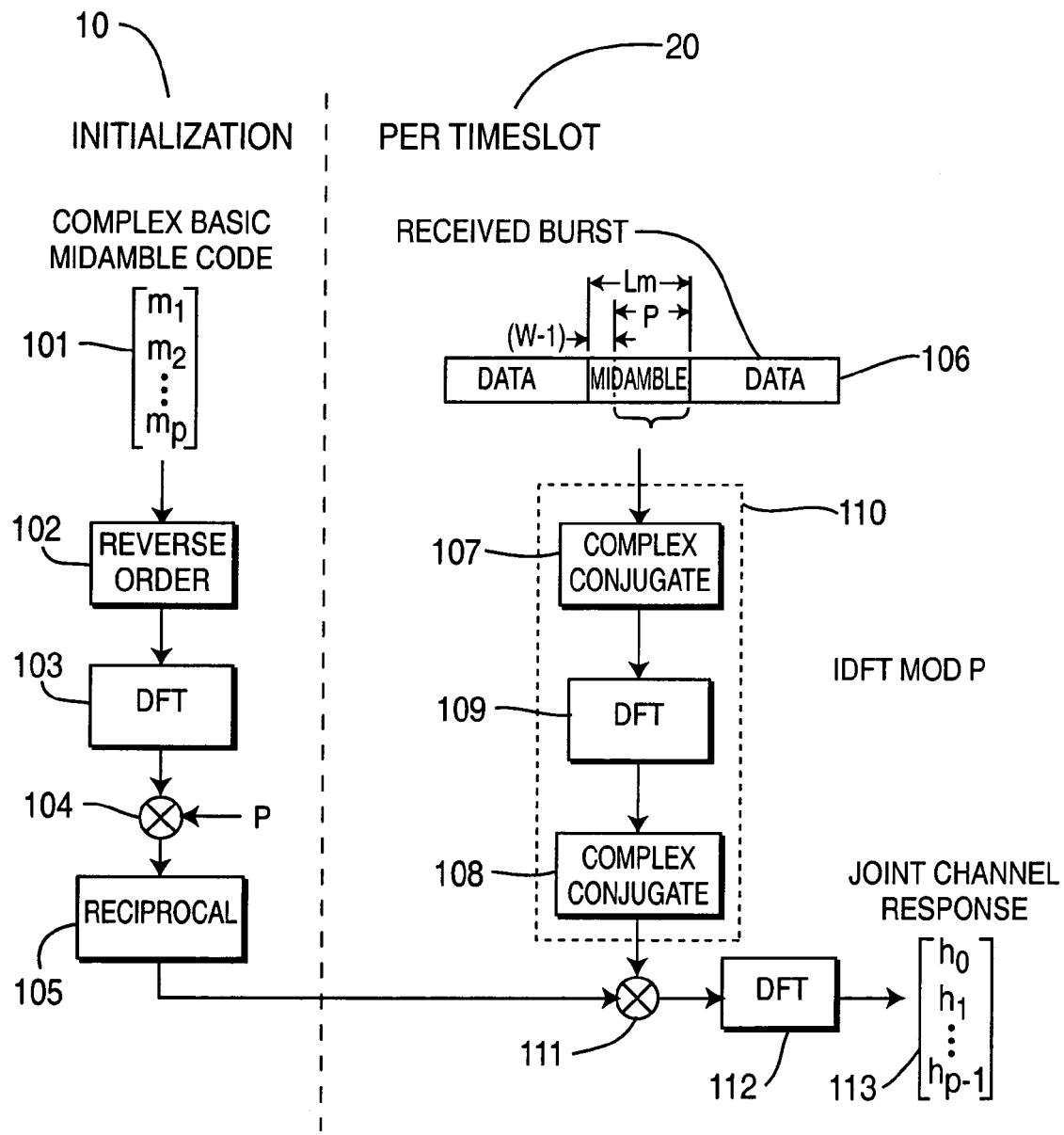
FIG. 1 shows a block diagram of a channel estimation process that includes DFT.

FIG. 1 shows a block diagram of a channel estimation process as found in a CDMA receiver, such as for a base station or UE, and using a multiuser detector (MUD). The MUD is used to estimate data for multiple users' communications. Initialization software 10 is executed in every handoff of a UE from one base station to another. During initialization, the discrete Fourier transform (DFT) of each complex basic midamble code is computed and saved. A complex basic midamble code 101 represents an ideal predetermined midamble used as the reference for comparison of the received signal when performing channel estimation. The midamble 101 values are passed through reverse order block 102, a DFT block 103 stored in memory, multiplied by a value P that represents the number of points to be processed, and then the reciprocal 105 of the output is calculated to complete the initialization process.

The received communication burst 106 is processed by algorithm 20 as shown in FIG. 1. As shown in FIG. 1, the number of values in the received signal's midamble, represented by a length $L_m$, is reduced to a portion P of values that are operated on during the estimation process. Portion P of the midamble is received by block 110 which performs the function (P×IDFT), where IDFT represents the inverse DFT process. The complex conjugate operations 107, 108 are performed on the DFT of the midamble values prior to the DFT 109 and following the DFT 109, respectively, to create the inverse DFT 110. A DFT 112 is performed on the product of the initialization 10 results and the midamble processing 20 results to produce a joint channel response 113. This entire process can be shown as Equation 2.

$$[h_0 \; h_1 \; \cdots \; h_{P-1}] = DFT\left(\left[\frac{b_0}{P \cdot a_0} \; \frac{b_1}{P \cdot a_1} \; \cdots \; \frac{b_{P-1}}{P \cdot a_{P-1}}\right]\right), \quad \text{Equation 2}$$

where $[b_i]_{i=0}^{P-1}$ is the DFT of the complex conjugated received midamble signal $R_i$, $$[b_0 \; b_1 \; \cdots \; b_{P-1}] = DFT([r_i]_{i=0}^{P-1}) \quad \text{Equation 3}$$

and $[a_i]_{i=0}^{P-1}$ is the DFT of the complex basic midamble code $m_i$ $$[a_0 \; a_1 \; \cdots \; a_{P-1}] = DFT([m_P \; m_{P-1} \; \cdots \; m_1]) \quad \text{Equation 4}$$

The DFT optimizations presented hereafter pertain to DFT blocks 109, 112 as shown in FIG. 1. The first form of optimization to the DFT in accordance with the present invention is to accelerate the processing by taking advantage of quicker prime number computations using a prime factor algorithm (PFA). A PFA can be used when the number of processed values P is divisible by factors F that are prime relative to one another. The algorithm can be divided into separate modules for separate permutations repeated P/F times. For example, for P=456, three possible prime factors are F1=3, F2=8 and F3=19, where 3×8×19=456. At a first module M1, a 3-point DFT is repeated 8×9=152 times; at a second module M2, an 8-point DFT is repeated 3×19=57 times; and at a third module M3, a 19-point DFT is repeated 3×8=24 times. Accordingly, for a value P=456, using a PFA optimizes the DFT process by reducing the number of operations, since (3*152)+(8*57)+(19*24)=1368, which is significantly less than $P^2$=207,936.

Figures 2A, 2B:
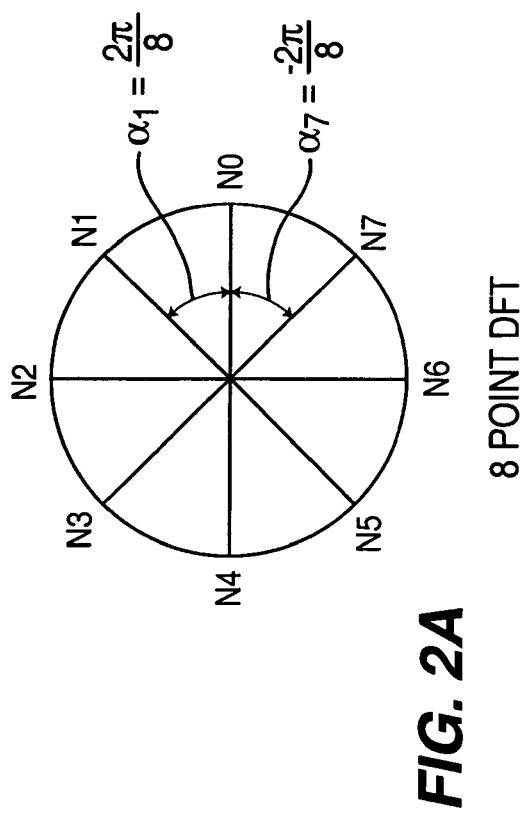
FIG. 2A shows the angular division for an 8-point DFT for points N0–N7.
FIG. 2B shows a real and imaginary twiddle factors for an 8-point DFT for twiddle sets 0–7 and points N0–N7.

A second form of DFT optimization is achieved by aligning the N points of the DFT that have common twiddle factors and twiddle sets. As shown in FIG. 2A, the angular division for an 8-point DFT has a notable angular symmetry between points N1 and N7, N2 and N6, and N3 and N5. Each DFT output can be considered an input row vector multiplied by the twiddle factor set column vector. These twiddle vectors have both an inter-twiddle set and an intra-twiddle set symmetry that optimize the DFT by requiring fewer multiplications. The intra twiddle factor set symmetry can be seen in FIG. 2B where the columns for points N3 and N5, N2 and N6, and N1 and N7 have symmetry due to their angular relationship. Similarly, there is symmetry for the imaginary twiddle factors except that the values in the columns for points N5, N6 and N7 are the negative of the values in columns for points N3, N2 and N1, respectively. Inter-twiddle factor set symmetry is shown for the real twiddle factors in FIG. 2B for twiddle sets 3 and 5, 2 and 6, and 1 and 7. For the imaginary twiddle factors, the same sets are symmetrical except that sets 5, 6, 7 are the opposite sign of sets 3, 2, 1. Using these symmetries, FIG. 2C shows the reduced number of DFT calculations for the real and imaginary portions of the signal, where $\cos(k_i)$ and $\sin(k_i)$ represent the real and imaginary twiddle factors respectively, $X_R(0 \ldots 7)$ represent the real values for points N0 to N7 of the 8 point DFT and $X_I(0 \ldots 7)$ represent the imaginary values. As shown in FIG. 2C, there are five twiddle factors $\cos(k_0)$ through $\cos(k_4)$ and four twiddle factors $\sin(k_1)$ through $\sin(k_4)$. By aligning the values $X_R$, $X_I$ with common twiddle factors in this way, about half as many operations need to be performed since otherwise there would be processing of twiddle sets for $k_0$ through $k_7$. Thus, a 4× speed improvement can be realized by taking advantage of both inter-twiddle set and intra-twiddle set optimizations.

Figure 3A:
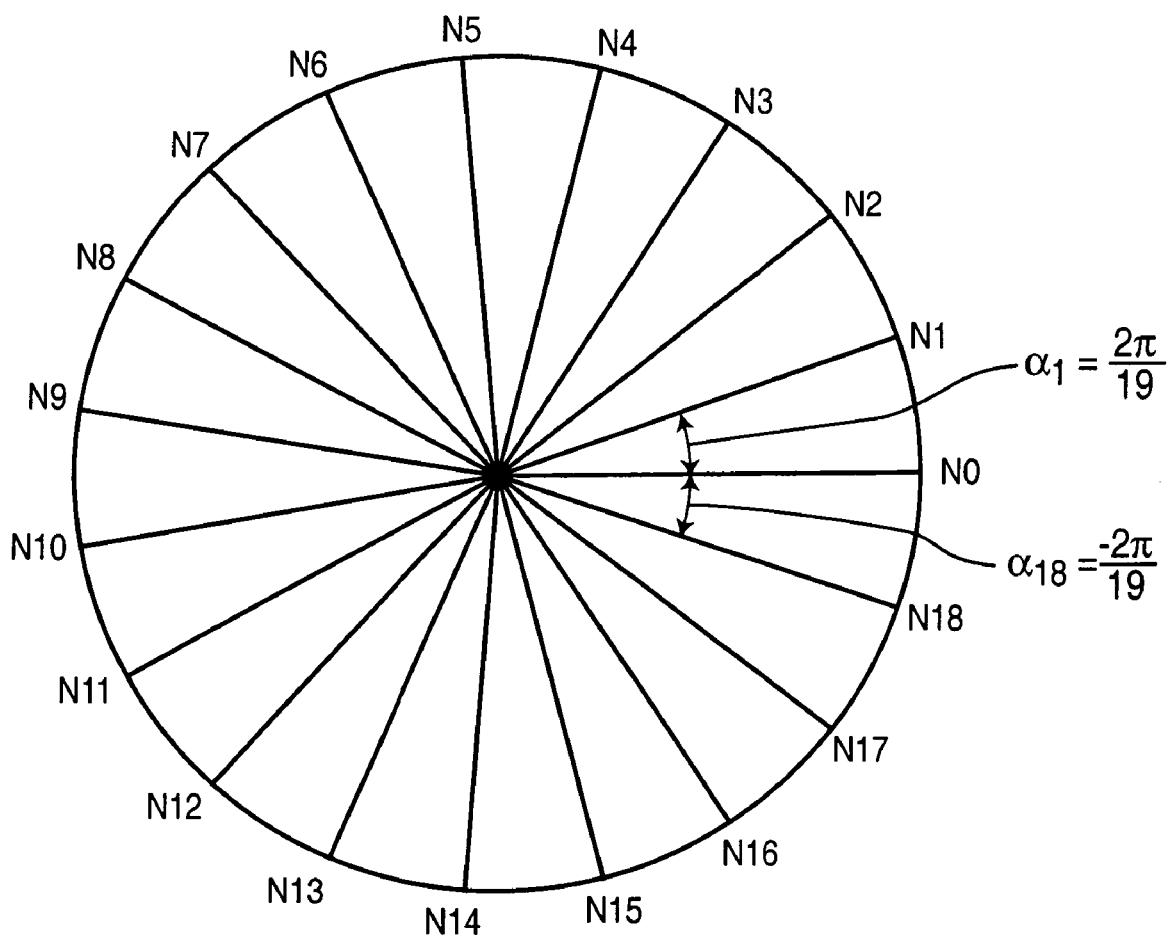
FIG. 3A shows the angular division for a 19-point DFT with points N0–N18.

FIGS. 3A, 3B, 3C and 3D pertain to a 19 point DFT, which is similar to the 8-point DFT shown in FIGS. 2A, 2B and 2C. It is worth noting that the odd-size 19-point DFT in which only the point N0 is not symmetrical with any of the remaining 18 points. This means that unlike the even size 8-point DFT, which has two asymmetrical points, N0 and N4, an odd size DFT provides added efficiency with only one asymmetrical point and one less extra calculation set to be performed. As shown in FIGS. 3B and 3C, twiddle sets 1–9 are representative for the remaining twiddle sets 10–18. Also, the nine columns for DFT points N1–N9 are symmetric to the columns for points N10–N18, rendering the latter set as redundant and unnecessary for storage as coefficients for the calculation. Turning to FIG. 3D, the optimized set for the input of the 19 point DFT is shown where the real twiddle factors $\cos(k_i)$ are a reduced set of 10 from an un-optimized set of 19 and the imaginary twiddle factors $\sin(k_i)$ are reduced to a set of 9. Since $\sin(k_0)$=0, this twiddle factor is omitted, leaving nine imaginary twiddle factors.

The efficient grouping of operations as shown for 8-point and 19-point DFTs in FIGS. 2C and 3D is generally described as:

$$\text{real} = X_R(0)\cos(k_0) + \quad \text{Eq. 5, 6}$$

-continued $$\sum_{i=1}^{\left[\frac{F}{2}\right]} (X_R(i) + X_R(F-i)\cos(k_i)) + (X_I(i) - X_I(F-i))\sin(k_i)$$

$$\text{imag} = X_R(0)\sin(k_0) + \sum_{i=1}^{\left[\frac{F}{2}\right]} (X_I(i) + X_I(F-i))\sin(k_i) -$$

$$(X_R(i) - X_R(F-i))\cos(k_i)$$

for odd P and:

$$\text{real} = X_R(0)\cos(k_0) + X_R\left(\frac{F}{2}\right)\cos\left(k_{\frac{F}{2}}\right) + \qquad \text{Eq. 7, 8}$$

$$\sum_{i=1}^{\frac{F}{2}-1} (X_R(i) + X_R(F-i))\cos(k_i) + (X_I(i) - X_I(F-i))\sin(k_i)$$

$$\text{imag} = X_R(0)\sin(k_0) + X_R\left(\frac{F}{2}\right)\sin\left(k_{\frac{F}{2}}\right) +$$

$$\sum_{i=1}^{\frac{F}{2}-1} (X_I(i) + X_I(F-i))\sin(k_i) + (X_R(i) - X_R(F-i))\cos(k_i)$$

for even P.

Figure 5:
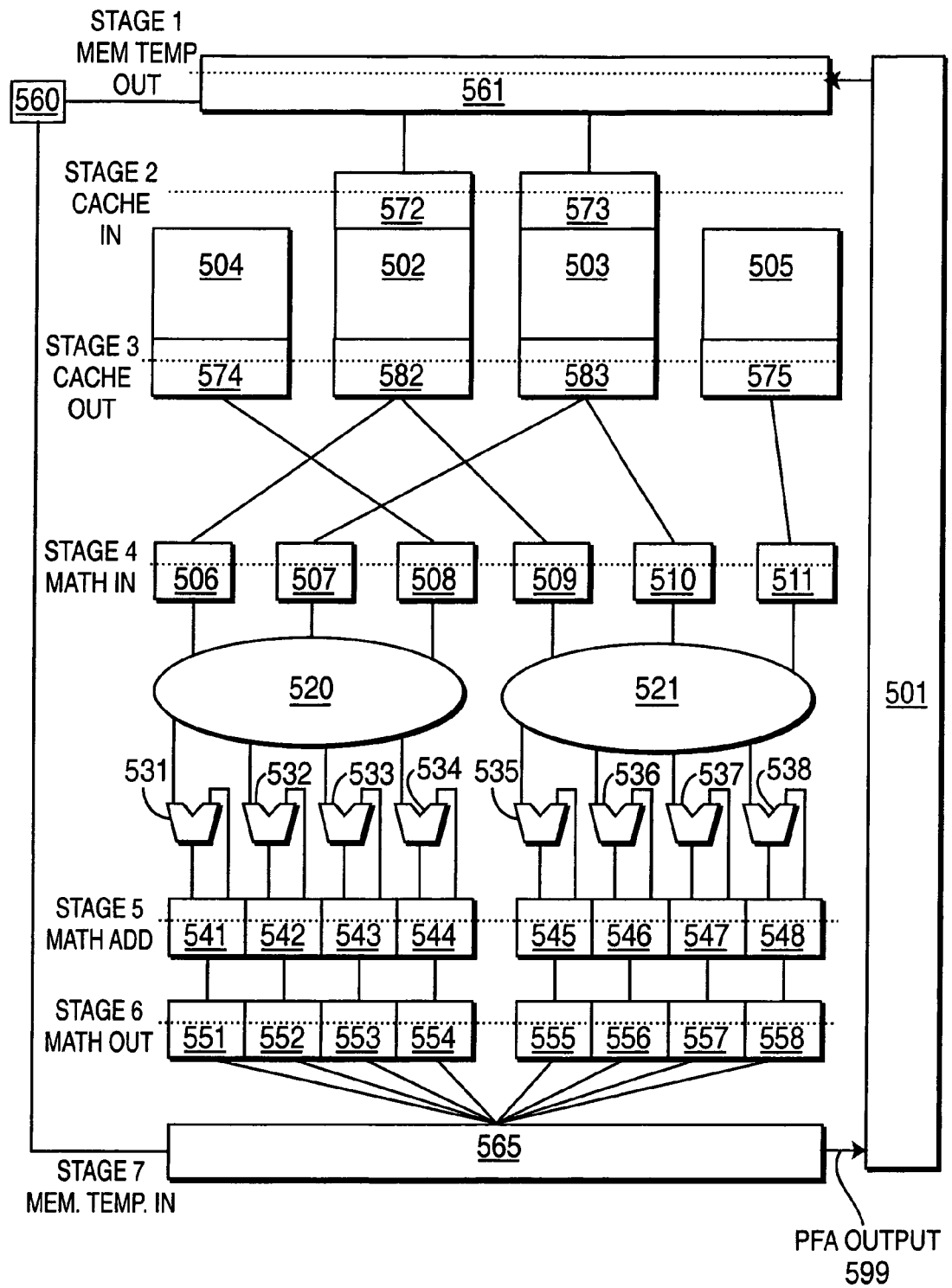
FIG. 5 shows a block diagram of the circuit used to perform the modified DFT process in accordance with the present invention.

FIG. 5 shows a block diagram of a circuit for the modified DFT process. Block 501 represents memory used to store the portion P of midamble chips. A controller 560, preferably a memory enable, selectively processes the set of P values according to which F-point DFT module is currently in use. This occurs by way of MUX 561 which retrieves the P values from memory 501, and distributes the P values to the next stage. Between stages 1 and 2, the set of P values are processed in groups of N, where N=F, and subsequently transmitted through ports 562, 563 to memory caches 502 and 503, preferably RAM. Caches 502, 503 retrieve the chip values into input registers 572, 573 and distribute them as an input permutation at stage 3 from output registers 582, 583 simultaneously with predetermined twiddle factors stored in memory 504 and 505, preferably ROM, to produce the optimized DFT function using the aforementioned parallel efficiencies. The twiddle values are distributed at stage 3 from output registers 574,575.

This permutation for the modified DFT can be expressed by general equations 9 and 10.

Input Address=($n1*T1*F+n2*F$) Mod (Input Data Size)   Equation 9

Output Address=($n1*T1*F+n2*T2*F$) Mod (Input Data Size)   Equation 10 where
 F=The factor used as the DFT size.
 F'=Number of DFT repetitions (Input Data Size/DFT Size)
 T1 is solved for F*T1 Mod F'=1
 T2 is solved for F'*T2 Mod F=1
 n1=1 to F', incrementing for each new DFT
 n2=1 to F, incrementing through the points in each DFT This calculation is done separately for each factor F of the data size. For the 456 input data size process divided into three modules of 3, 8 and 19 point DFTs, the above variables are:

F=3, 8, or 19
 F'=456/3, 456/8, or 456/19
 n1=1 to 152, 1 to 57, or 1 to 24
 n2=1 to 3, 1 to 8, or 1 to 19

Returning to FIG. 5, input registers 506–511 receive the input permutation at stage 4 in order for the PFA circuits 520, 521 to perform the F-point DFT processing. By using two parallel PFA circuits 520, 521, in tandem with two twiddle registers 504, 505, this modified DFT process has double the capacity of a normal DFT process. Adders 531–538 work in conjunction with registers 541–548 to perform a running summation of PFA circuit 520, 521 outputs for a single twiddle set. Once the sum associated with operations for a single twiddle set is completed at stage 5, the result is sent at stage 6 to a corresponding output register 551–558. A register 565 at stage 7 temporarily stores the PFA outputs 599 to be sent through the single port to memory 501.

Figure 4A:
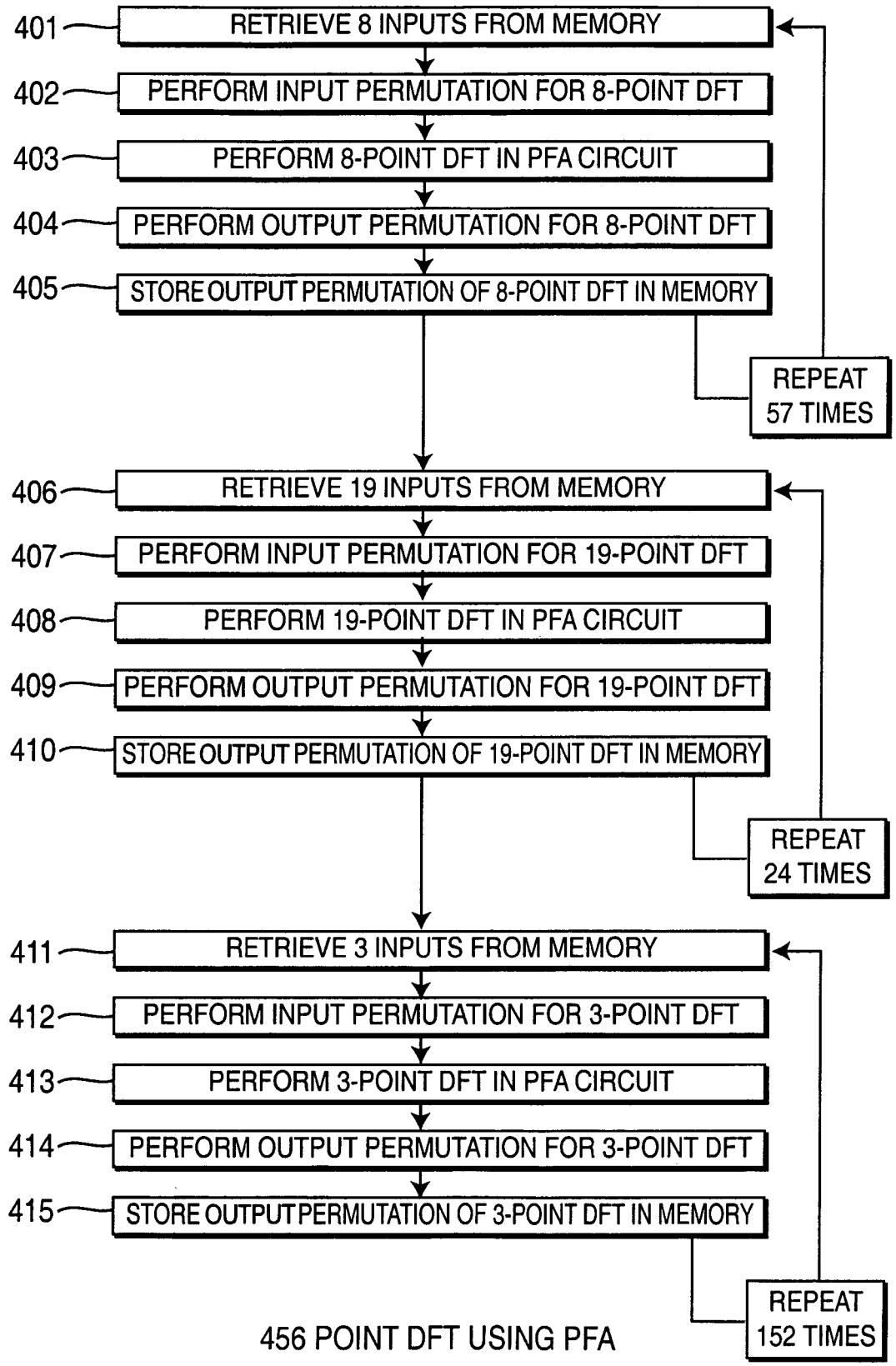
FIG. 4A shows the process flow diagram for a 456-point DFT process using PFA.

FIG. 4A shows the flow diagram for the entire process of a 456 point DFT using PFA as performed by DFT blocks 109, 112 of FIG. 1. In process 401, the received midamble chip values begin to be retrieved from memory one value at a time and loaded into temporary memory output register 561 and then to two single port data cache input registers 572, 573. Next in process 402, the input permutation for the 8-point DFT is performed by retrieving the predetermined twiddle factors stored in registers 574,575 into input ports 508, 511, in a sequence that achieves the optimized factoring as shown in FIG. 2C. Simultaneously, the chip values are passed from the data cache output registers 582, 583 to PFA circuit input port registers 506, 507, 509, 510 of PFA circuits 520, 521, which are parallel to the twiddle factor input port registers 506, 511.

In process 403, each PFA circuit 520, 521 performs a set of subsequent operations associated with asymmetrical points of the DFT (e.g., N0 for an 8-point DFT) and for pairs of symmetrical points (e.g., N1 and N7 for an 8-point DFT). For an 8-point DFT using two PFA circuits, the first 8 of 456 values N0–N7 are processed by three sets of operations. In the first operation set, PFA circuit 520 operates on twiddle set 0 for points N0–N7 simultaneously with PFA circuit 521 which operates on twiddle set 1 for points N0–N7. Once the sums are completed and sent to output registers 551–558, the next set of operations is performed on twiddle sets 2 and 3 by PFA circuits 520, 521, respectively, and the results are subsequently summed and further processed by processes 404 and 405. The final operation set is performed on twiddle set 4 by PFA circuit 520. These three operation sets together form the first of 57 repeated DFT operations by the PFA circuit on the first 8 of 456 points.

Process 404 performs the output permutation for the outputs stored in stage 6 of FIG. 5 to allow the memory input register 565 to receive the output values in the proper sequence for the 8-point DFT. In process 405, the permuted output is temporarily stored in register 565 and the 456 locations in memory are updated with the new set of PFA output values 599 produced by the 8-point DFT.

It should be noted that processes 402–405 occur simultaneously for the respective operation sets within one cycle of the F-point DFT.

Processes 406–410 repeat processes 401–405 for a 19-point DFT, and likewise, processes 411–415 repeat the same set of processes for a 3-point DFT. The final output permutation stored in memory at process 415 represents the result produced by the three separate F-point DFTs and is identical to the result that a single 456-point DFT would achieve. It should be noted that the same results are obtained by altering the sequence in which the three F-point DFTs are performed.

Figure 4B:
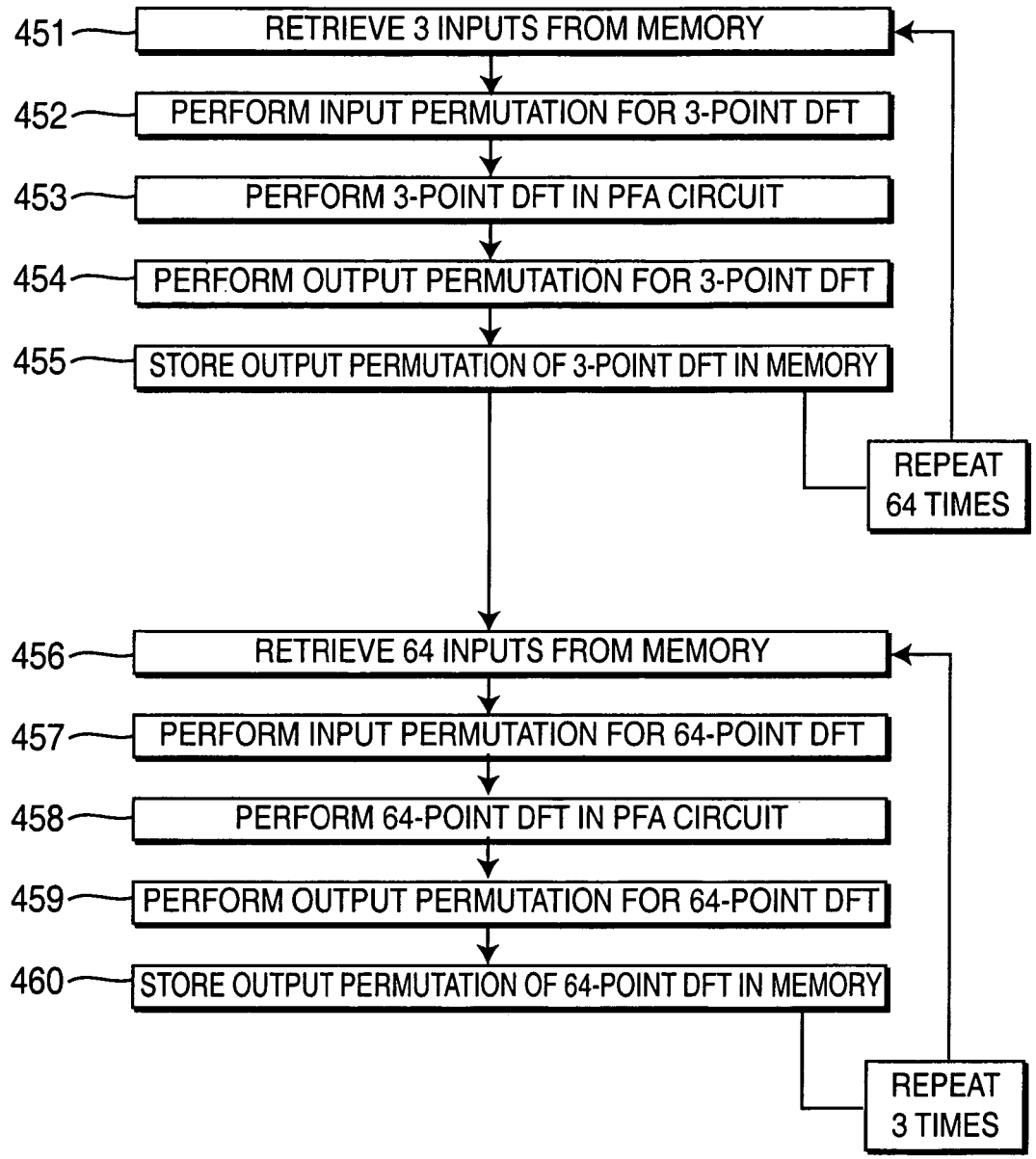
FIG. 4B shows a process flow diagram for a 192-point DFT process using PFA.

Similarly, a 192-point DFT using PFA can be performed by 64 cycles of the 3-point DFT followed by 3 cycles of the 64-point DFT, as shown by processes 451–460 in FIG. 4B. Alternately, the 64-point DFT in processes 456–460 can be performed prior to the 3-point DFT shown in processes 451–455 to achieve the same results.

Figure 6A:
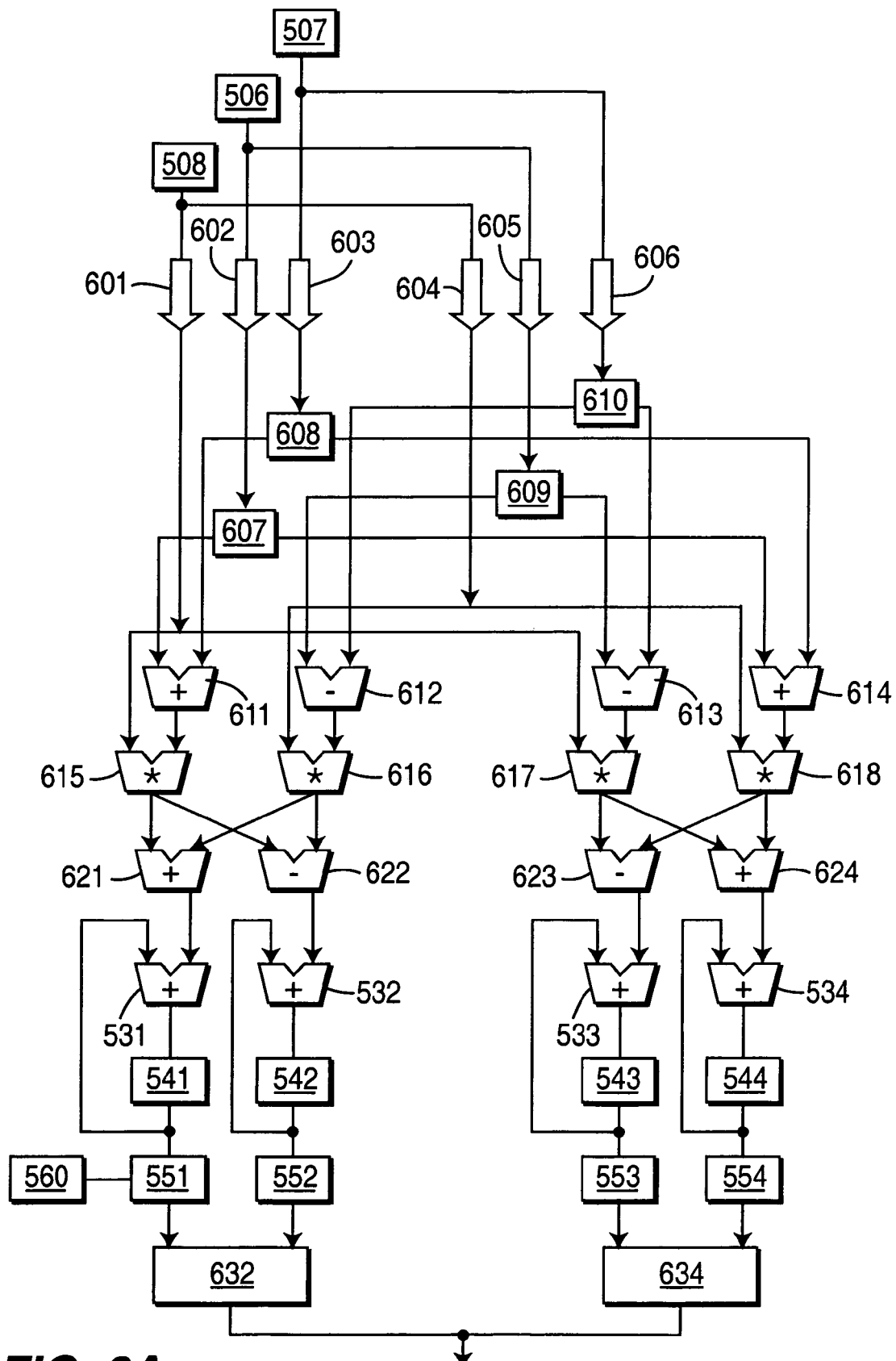
FIG. 6A shows a block diagram of a circuit used to perform a PFA function within the circuit shown in FIG. 5.

FIG. 6A shows the detail for PFA circuits 520, 521, including the real and imaginary data signal processing. The real twiddle values 601 and imaginary twiddle values 604 are extracted from register 508. Similarly, the real and imaginary portions of F-point values from registers 506, 507 are split into two input paths for processing by the PFA engine 520. Multiplexers 607, 608, 609 and 610 are used to control the sequence of real and imaginary values to the PFA engine, which allows the complex conjugate function 107 to be performed.

Returning to FIG. 2C, columns A and B contain expressions for the real portion of the DFT process, whereby adder 611 and multiplier 615 produce the expressions in column A, and subtractor 612 and multiplier 616 produce the expressions for column B. For an 8-point DFT, only adder 621 is required to perform the addition operation for each row of columns A and B. Adder 531 and register 541 are used to subsequently add each row of columns A and B. A controller 560 preferably performs a write enable for the output register 551 once all of the expressions for columns A and B have been summed. A MUX 632 is present for the purpose of controlling the output from registers 551 and 553 to memory register 565, allowing complex conjugate 108 to be performed. Output register 552 stores the result from an optional parallel processing of DFT expressions produced by subtractor 622, adder 532, and registers 542, 552 for other F-point DFT calculations, where subtraction between columns A and B may be required due to variations in positive and negative twiddle factors. The imaginary expressions shown in column C and D of FIG. 2C are calculated similarly by subtractor 613, adder 614, multiplier 617 and 618, subtractor 623, adder 533, and registers 543, 553. For this particular F-point DFT calculation of the imaginary portion, adders 624 and 534, and registers 544, 554 are not required, but could be used for some other value of F.

Figure 6B:
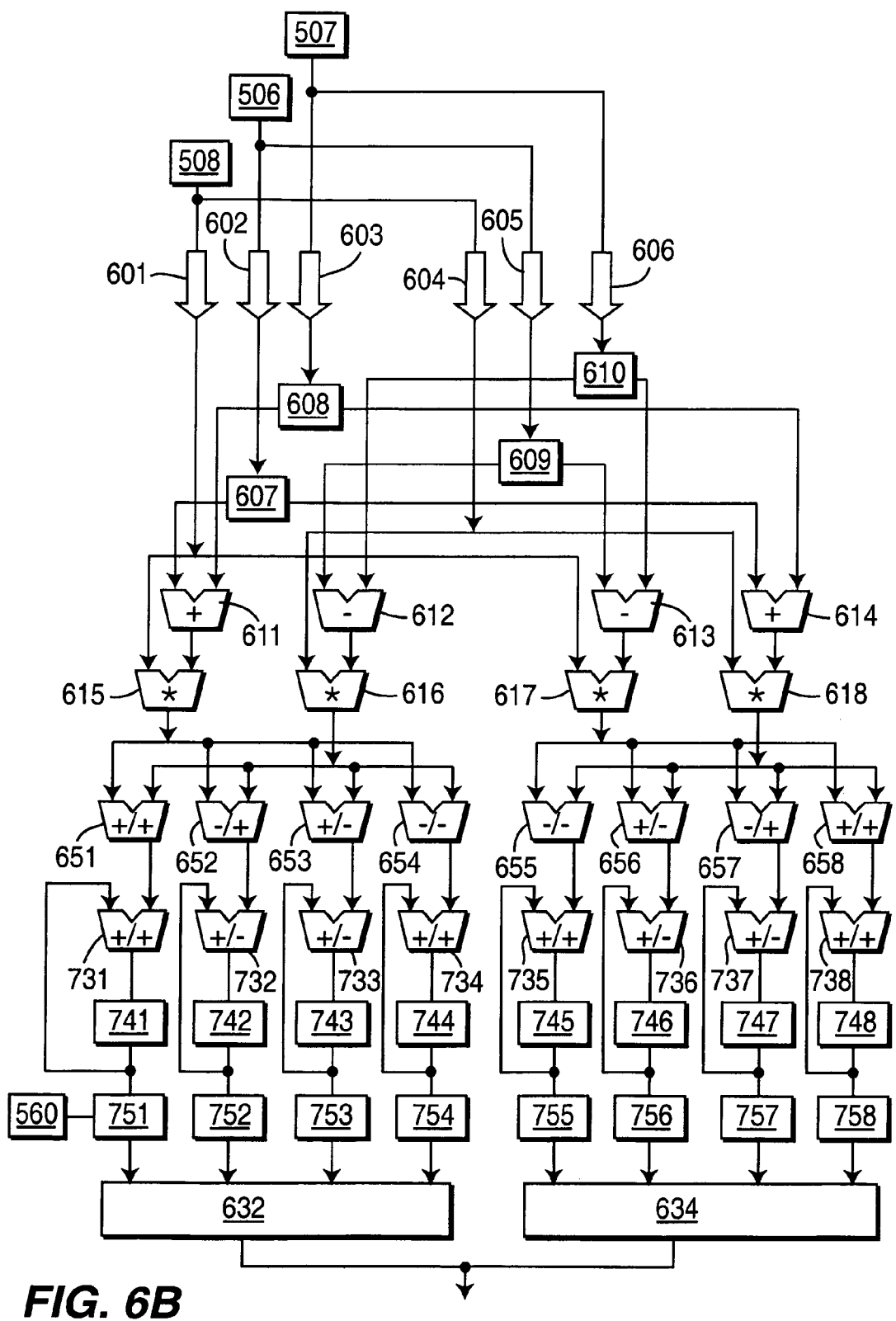
FIG. 6B shows an alternative embodiment of the circuit shown in FIG. 6A.

FIG. 6B shows an alternative embodiment for the PFA circuit shown in FIG. 6A in which additional parallel adders are used downstream of multiplier 615–618 to optionally allow further simultaneous operations where required by positive and negative twiddle value variations. Operators 651–654 are used in place of operators 621, 622 for the real portion of the DFT. Operators 731–734 correspond with adders 531,532, while allowing either addition or subtraction operations. Adding registers 741–744 and output registers 751–754 are similarly controlled by controller 560 to send the DFT result to real output MUX 632. Likewise, for the imaginary portion of the DFT operation, four parallel sets of adder components as shown in FIG. 6B are used in place of two parallel sets of adders shown in FIG. 6A. Adder components 655–658 and 735–738 can perform either addition or subtraction on the DFT factors output from multipliers 617, 618. Adding registers 745–748 and output register 755–758 perform the same functions as adder registers 543, 544 and output registers 553, 554 for sending DFT results to imaginary output MUX 634.

FIG. 7 shows the timing sequence for the processing of values for an 8-point DFT through stages 1–7 in FIG. 5. At stage 1, the first 8 values are retrieved from memory 501 through the single port to register 561, one value per clock pulse. At stage 2, data cache input register 572 receives the first five values for points N0–N4 delayed by one clock pulse from stage 1. Cache input register 573 receives the last three values for points N5–N7 also delayed by one clock pulse with respect to stage 1. At stages 3 and 4 from clock pulses 10–15, the input permutation is shown for points N0–N7 with twiddle sets 0 and 1, between the data cache output registers 582,583, twiddle registers 574, 575, and the PFA circuit input ports 506–511. As shown by FIG. 7, each DFT point value is sent with its corresponding twiddle factor within the twiddle set. It is also evident that by using two twiddle registers 574 and 575, two twiddle sets can be permuted during each clock pulse. For the symmetrical DFT points, such as N1 and N7, the earlier described optimization is shown for each clock pulse as each symmetrical pair of values is permuted with their common twiddle point.

At stage 5, one clock pulse behind stage 4, the output of the PFA circuits 520, 521 are received by add registers 541, 545 and 546. With each subsequent pulse, the adders 531, 535 and 536 perform the sum of the PFA circuit output to the prior PFA circuit output stored by the add registers 541, 545, 546, until the fifth pulse (clock pulse 16), when the final DFT operation for the cycle is received (from stage 4, clock pulse 15) and summed. Next in stage 6, each of the summed values from add registers 541, 545 and 546 are sent in a single clock pulse to the output registers 551, 555, 556 where these values are kept until memory input register 565 sends each value, one per clock pulse, to the memory 501.

Thus, at clock pulse 21, the first set of 8 DFT points N0–N7 are processed with the first 2 twiddle sets 0 and 1. Meanwhile, at each stage, the points N0–N7 are processed with the next two twiddle sets with each set of 5 clock pulses. For example, at stage 3, twiddle sets 0 and 1 are processed during clock pulses 10–14; twiddle sets 2 and 3 are processed during pulses 15–19; and twiddle set 4 is processed during pulses 20–24. The first full DFT cycle is completed by clock pulse 31.

The shaded areas of FIG. 7 indicate the second DFT cycle process timing, beginning with the second set of 8 DFT points N8–N15 being retrieved from memory 501. The 8-point DFT process is completed for 57 cycles in a fashion similar to that described for the first cycle.

The timing of the DFT process shown in FIG. 7 is generally representative for any F-point DFT process.

What is claimed is:
1. In a wireless receiver, a method for DFT processing a selected number P of midamble data values, where P has a plurality of relatively prime factors $N_i$, for i=1 to M, where

$$\prod_{i=1}^{M} N_i = P,$$

comprising the steps:
  storing P data values in a memory;
  inputting P data values at a control circuit from said memory for M consecutive iterations, one for each factor $N_i$, such that K=$N_i$ and P/$N_i$ groups of data values are processed for each iteration; and
  DFT processing, by selectively controlled DFT processing circuitry, data values in groups of a selected number K, comprising:
    storing twiddle sets in first and second twiddle registers associated with DFT processing of all factors $N_i$;

receiving in a first cache L selected values of each group of K data values, where L≧K/2;

receiving in a second cache K-L other data values of each group of K values such that the processing of the data values received in the second cache has twiddle sets symmetrical to some of the data values received in the first cache;

processing, by a first prime factor algorithm (PFA) circuit, K data value groups received from said first and second caches and said first twiddle register; and processing, by a second PFA circuit, the same K data value groups in tandem with said first PFA circuit using a twiddle sets from said second twiddle register.

2. The invention of claim 1 wherein said processing further comprises combining outputs of the first and second PFA circuits for output by said processing circuitry.

3. The invention of claim 1 further comprising outputting the DFT processed data to said memory, whereby each successive N point DFT processing of the stored P data values processes the values output from a prior DFT processing iteration.

4. The invention of claim 3 wherein P=456, M=3, $N_1$=3, $N_2$=8, $N_3$=19.

5. The invention of claim 4 wherein K=$N_1$ for a first DFT processing iteration, K=$N_2$ for a second DFT processing iteration and K=$N_3$ for a third DFT processing iteration.

6. The invention of claim 3 wherein P=192, M=2, $N_1$=3 and $N_2$=64.

* * * * *

UNITED STATES PATENT AND TRADEMARK OFFICE
CERTIFICATE OF CORRECTIO iN

PATENT NO. : 7,028,064 B2 Page 1 of 1
APPLICATION NO. : 10/782035
DATED : April 11, 2006
INVENTOR(S) : Buchert et al.

It is certified that error appears in the above-identified patent and that said Letters Patent is hereby corrected as shown below:

At column 2, line 36, after the word "twiddle", delete "factors" and insert therefor --factor--.

At column 5, line 4, delete middle section "+ $X_R(F - i)\cos(k_i))$ +", and insert therefor -- + $X_R(F - i))\cos(k_i)$ + --.

At column 5, line 26, delete middle section " + $X_1(F - i))\sin(k_i)$ + ", and insert therefor -- + $X_1(F - i))\sin(k_i)$ – --.

IN THE CLAIMS

At claim 1, column 9, line 13, after the words "a twiddle", delete "sets" and insert --set--.

Signed and Sealed this

Third Day of October, 2006

JON W. DUDAS
*Director of the United States Patent and Trademark Office*